(12) United States Patent
Steelberg et al.

(10) Patent No.: US 8,099,326 B2
(45) Date of Patent: Jan. 17, 2012

(54) TRAFFIC ESTIMATOR

(75) Inventors: Chad Steelberg, Newport Beach, CA (US); Ryan Steelberg, Irvine, CA (US); Scott Beauchamp, Newport Beach, CA (US); Russell Kevin Ketchum, Newport Beach, CA (US); Eliot Clingman, San Diego, CA (US); Robert Gardner, Irvine, CA (US)

(73) Assignee: Google Inc., Mountain View, CA (US)

( * ) Notice: Subject to any disclaimer, the term of this patent is extended or adjusted under 35 U.S.C. 154(b) by 1231 days.

(21) Appl. No.: 11/554,934

(22) Filed: Oct. 31, 2006

(65) Prior Publication Data

US 2008/0021791 A1 Jan. 24, 2008

Related U.S. Application Data

(63) Continuation-in-part of application No. 11/445,768, filed on Jun. 1, 2006.

(60) Provisional application No. 60/686,535, filed on Jun. 1, 2005.

(51) Int. Cl.
*G06Q 30/00* (2006.01)
(52) U.S. Cl. .................................................. 705/14.64
(58) Field of Classification Search .................. None
See application file for complete search history.

(56) References Cited

U.S. PATENT DOCUMENTS

| 4,517,562 | A | 5/1985 | Martinez |
| 5,260,778 | A | 11/1993 | Kauffman et al. |
| 5,422,624 | A | 6/1995 | Smith |
| 5,504,482 | A | 4/1996 | Schreder |
| 5,515,098 | A | 5/1996 | Carles |
| 5,649,300 | A | 7/1997 | Snyder et al. |
| 5,664,948 | A | 9/1997 | Dimitriadis et al. |
| 5,697,844 | A | 12/1997 | Von Kohorn |
| 5,738,583 | A | 4/1998 | Comas et al. |
| 5,806,018 | A | 9/1998 | Smith et al. |
| 5,999,808 | A | 12/1999 | LaDue |
| 6,104,815 | A | 8/2000 | Alcorn et al. |
| 6,198,906 | B1 | 3/2001 | Boetje et al. |
| 6,212,392 | B1 | 4/2001 | Fitch et al. |
| 6,298,218 | B1 | 10/2001 | Lowe et al. |
| 6,416,414 | B1 | 7/2002 | Stadelmann |
| 6,430,603 | B2 | 8/2002 | Hunter |

(Continued)

FOREIGN PATENT DOCUMENTS

CN  128079 A  2/2001

(Continued)

OTHER PUBLICATIONS

"By Using Multicast, Wireless Communication, New Information Can Be Distributed," Nikkei Internet Technology, Sep. 22, 1997, pp. 106-111, vol. 3.

(Continued)

*Primary Examiner* — Namrata Boveja
*Assistant Examiner* — Colleen Hoar
(74) *Attorney, Agent, or Firm* — Fish & Richardson P.C.

(57) ABSTRACT

Systems, methods, and a user interface are used for bidding on media plays. The user can specify criteria for play of the media play, including times, stations, and budgets. A traffic estimator uses historical data to estimate bids and auctions, and the likelihood of winning, for generating listener traffic based on the criteria.

19 Claims, 8 Drawing Sheets

U.S. PATENT DOCUMENTS

| | | | |
|---|---|---|---|
| 6,470,180 B1 | 10/2002 | Kotzin et al. | |
| 6,508,710 B1 | 1/2003 | Paravia et al. | |
| 6,526,275 B1 | 2/2003 | Calvert | |
| 6,527,638 B1 | 3/2003 | Walker et al. | |
| 6,527,641 B1 | 3/2003 | Sinclair et al. | |
| 6,628,928 B1 | 9/2003 | Crosby et al. | |
| 6,628,939 B2 | 9/2003 | Paulsen | |
| 6,650,892 B1 | 11/2003 | Thiriet | |
| 6,674,995 B1 | 1/2004 | Meyers et al. | |
| 6,678,501 B1 | 1/2004 | Valeski | |
| 6,735,435 B2 | 5/2004 | Newell et al. | |
| 6,767,284 B1 | 7/2004 | Koza | |
| 6,778,820 B2 | 8/2004 | Tendler | |
| 6,792,383 B2 * | 9/2004 | Brouillard et al. | 702/158 |
| 6,895,238 B2 | 5/2005 | Newell et al. | |
| 6,957,041 B2 | 10/2005 | Christensen et al. | |
| 6,975,835 B1 | 12/2005 | Lake et al. | |
| 7,590,581 B1 * | 9/2009 | Payne et al. | 705/36 R |
| 7,689,590 B2 * | 3/2010 | Fox | 707/999.107 |
| 2001/0003099 A1 | 6/2001 | Von Kohorn | |
| 2001/0034772 A1 | 10/2001 | Fisher et al. | |
| 2001/0042019 A1 | 11/2001 | Omachi | |
| 2001/0048748 A1 | 12/2001 | Van Ryzin | |
| 2001/0055954 A1 | 12/2001 | Cheng | |
| 2002/0038455 A1 | 3/2002 | Srinivasan et al. | |
| 2002/0049037 A1 | 4/2002 | Christensen et al. | |
| 2002/0049717 A1 | 4/2002 | Routtenberg et al. | |
| 2002/0059619 A1 | 5/2002 | Lebar | |
| 2002/0069404 A1 | 6/2002 | Copeman et al. | |
| 2002/0087532 A1 | 7/2002 | Barritz et al. | |
| 2002/0095339 A1 | 7/2002 | Galloway | |
| 2002/0132575 A1 | 9/2002 | Kesling et al. | |
| 2002/0151272 A1 | 10/2002 | Simon | |
| 2002/0168967 A1 | 11/2002 | Clapper | |
| 2003/0014483 A1 | 1/2003 | Stevenson et al. | |
| 2003/0032409 A1 | 2/2003 | Hutcheson et al. | |
| 2003/0033292 A1 | 2/2003 | Meisel et al. | |
| 2003/0055816 A1 | 3/2003 | Paine et al. | |
| 2003/0069032 A1 | 4/2003 | Jarvi et al. | |
| 2003/0119528 A1 | 6/2003 | Pew et al. | |
| 2003/0139190 A1 | 7/2003 | Steelberg et al. | |
| 2003/0149988 A1 | 8/2003 | Ellis et al. | |
| 2003/0182266 A1 | 9/2003 | Stern | |
| 2003/0225641 A1 | 12/2003 | Gritzmacher et al. | |
| 2004/0028388 A1 | 2/2004 | Kataoka et al. | |
| 2004/0038723 A1 | 2/2004 | Schneier et al. | |
| 2004/0064524 A1 | 4/2004 | Van Steenbergen et al. | |
| 2004/0093394 A1 | 5/2004 | Weber et al. | |
| 2004/0117831 A1 | 6/2004 | Ellis et al. | |
| 2004/0127199 A1 | 7/2004 | Kagan et al. | |
| 2004/0177383 A1 | 9/2004 | Martinolich et al. | |
| 2004/0194131 A1 | 9/2004 | Ellis et al. | |
| 2005/0021521 A1 | 1/2005 | Wycoff | |
| 2005/0090279 A9 | 4/2005 | Witkowski et al. | |
| 2005/0137958 A1 | 6/2005 | Huber et al. | |
| 2005/0188402 A1 | 8/2005 | de Andrade et al. | |
| 2005/0198317 A1 | 9/2005 | Byers | |
| 2005/0239402 A1 | 10/2005 | Gioscia et al. | |
| 2005/0267817 A1 | 12/2005 | Barton et al. | |
| 2005/0289630 A1 | 12/2005 | Andrews et al. | |
| 2007/0027762 A1 * | 2/2007 | Collins et al. | 705/14 |

FOREIGN PATENT DOCUMENTS

| | | |
|---|---|---|
| JP | 03-184486 | 8/1991 |
| JP | 05-284162 | 10/1993 |
| JP | 05-505028 | 6/1995 |
| JP | 09-018430 | 1/1997 |
| JP | 2000-24427 | 9/2000 |
| WO | WO 99/49663 | 9/1999 |
| WO | WO 02/01869 A1 | 1/2002 |

OTHER PUBLICATIONS

"Eonstreams, Inc. Secures Financing to Deploy Revolutionary Ad Insertion Capability," SOURCE Eonstreams, Inc., Mar. 29, 2005, 2 Pages, [online] [retrieved on Apr. 8, 2005] Retrieved from the Internet: <URL: http://www.prnewswire.com/cgi-bin/stories.pl?ACCT=104&STORY=/www/story/03-29-2005/0003288...>.

"Eonstreams, Advertise with us!," Eonstreams, Inc., 2006, 1 page, [online] [retrieved on Apr. 28, 2006] Retrieved from the Internet: <URL: http://www.eonstreams.com/Advertisers.htm>.

"Eonstreams, advertising . . . ," Eonstreams, Inc., 2004, 1 page, [online] [retrieved on Apr. 7, 2005] Retrieved from the Internet: <URL: http://www.eonstreams.com/ServicesAdv.htm>.

"Eonstreams, be on eon!," Eonstreams, Inc., 2004, 1 page, [online] [retrieved on Apr. 7, 2005] Retrieved from the Internet: <URL: http://www.eonstreams.com/>.

"Eonstreams, Better together . . . ," Eonstreams, Inc., 2006, 1 page, [online] [retrieved on May 22, 2006] Retrieved from the Internet: <URL: http://www.eonstreams.com/>.

"Eonstreams, case studies . . . ," Eonstreams, Inc., 2004, 2 pages., [online] [retrieved on Apr. 7, 2005] Retrieved from the Internet: <URL: http://www.eonstreams.com/SamplesCase.htm>.

"Eonstreams, clients love us . . . ," Eonstreams, Inc., 2004, 1 page, [online] [retrieved on Apr. 7, 2005] Retrieved from the Internet: <URL: http://www.eonstreams.com/Testimonials.htm>.

"Eonstreams, FAQs," Eonstreams, Inc., Mar. 3, 2006, 7 pages, [online] [retrieved on Apr. 28, 2006] Retrieved from the Internet: <URL: http://www.eonstreams.com/HowToFaqs.htm>.

"Eonstreams, Kevin Woods, CTO," Eonstreams, Inc., 2004, 1 page, [online] [retrieved on Apr. 7, 2005] Retrieved from the Internet: <URL: http://www.eonstreams.com/CoInfoCTO.htm>.

"Eonstreams, pay-per-view . . . ," Eonstreams, Inc., 2004, 1 page, [online] [retrieved on Apr. 7, 2005] Retrieved from the Internet: <URL: http://www.eonstreams.com/ServicesPPV.htm>.

"Eonstreams, Press releases . . . ," Eonstreams, Inc., Feb. 2, 2006, 6 pages, [online] [retrieved on Apr. 28, 2006] Retrieved from the Internet: <URL: http://www.eonstreams.com/PressReleases.htm>.

"Eonstreams, Steve Newman, CEO," Eonstreams, Inc., 2004, 1 page, [online] [retrieved on Apr. 7, 2005] Retrieved from the Internet: <URL: http://www.eonstreams.com/CoInfoCEO.htm>.

"Eonstreams, streaming . . . ," Eonstreams, Inc., 2004, 1 page, [online] [retrieved on Apr. 7, 2005] Retrieved from the Internet: <URL: http://www.eonstreams.com/ServicesStreaming.htm>.

"Eonstreams, Streaming . . . ," Eonstreams, Inc., 2006, 1 page, [online] [retrieved on Apr. 28, 2006] Retrieved from the Internet: <URL: http://www.eonstreams.com/Streaming.htm>.

"Eonstreams, subscription . . . ," Eonstreams, Inc., 2004, 1 page, [online] [retrieved on Apr. 7, 2005] Retrieved from the Internet: <URL: http://www.eonstreams.com/ServicesSub.htm>.

"Eonstreams, Susan Seagraves, CFO," Eonstreams, Inc., 2004, 1 page, [online] [retrieved on Apr. 7, 2005] Retrieved from the Internet: <URL: http://www.eonstreams.com/CoInfoCFO.htm>.

"Eonstreams, testimonials, 650WSM Nashville's Country Legend!, WSM | Citadel Broadcasting Corporation," Eonstreams, Inc., 2004, 1 page, [online] [retrieved on Apr. 7, 2005] Retrieved from the Internet: <URL: http://www.eonstreams.com/TestimonialsWSM.htm>.

"Eonstreams, testimonials, Citadel Communications Corporation, WSM | Citadel Broadcasting Corporation," Eonstreams, Inc., 2004, 2 pages, [online] [retrieved on Apr. 7, 2005] Retrieved from the Internet: <URL: http://www.eonstreams.com/TestimonialsCitadel.htm>.

"Eonstreams, Tools . . . ," Eonstreams, Inc., 2006, 1 page, [online] [retrieved on Apr. 28, 2006] Retrieved from the Internet: <URL: http://www.eonstreams.com/How_To_Tools.htm>.

"Eonstreams, total solutions . . . ," Eonstreams, Inc., 2004, 1 page, [online] [retrieved on Apr. 7, 2005] Retrieved from the Internet: <URL: http://www.eonstreams.com/Services.htm>.

"Eonstreams, what we do . . . ," Eonstreams, Inc., 2004, 1 page [online] [retrieved on Apr. 7, 2005] Retrieved from the Internet: <URL: http://www.eonstreams.com/Samples.htm>.

"Eonstreams, Who we are . . . ," Eonstreams, Inc., 2006, 1 page [online] [retrieved on Apr. 28, 2006] Retrieved from the Internet: <URL: http://www.eonstreams.com/About_Us.htm>.

"Eonstreams, WIVK Knoxville, TN . . . ," Eonstreams, Inc., 2004, 1 page, [online] [retrieved on Apr. 7, 2005] Retrieved from the Internet: <URL: http://www.eonstreams.com/SamplesDemosWIVK.htm>.

"Eonstreams, Z100, NY . . . ," Eonstreams, Inc., 2004, 1 page, [online] [retrieved on Apr. 7, 2005] Retrieved from the Internet: <URL: http://www.eonstreams.com/SamplesDemosZ100.htm>.

Jones, J. L., et al., "Combinatorial Auctions Using Rule-Based Bids," Decision Support Systems, 2002, pp. 59-74, vol. 34.

"MediaSpan Online Services Partners With Eonstreams," EContentMag.com, Feb. 3, 2006, 3 pages, [online] [retrieved on Apr. 28, 2006] Retrieved from the Internet: <URL: http://www.econtentmag.com/Articles/ArticleReader.aspx?ArticleID=15031>.

"NAB2005 —The World's Largest Electronic Media Show," National Association of Broadcasters, 2005, 2 pages, [online] [retrieved on Apr. 28, 2006] Retrieved from the Internet: <URL: http://www.nabshow.com/exhibitors/NAB2005/company.asp?id=11150>.

"Streaming Audio and Video Development and Media Hosting Solutions," VitalStream, Inc., 2000-2006, 1 page [online] [retrieved on May 22, 2006] Retrieved from the Internet: <URL: http://www.vitalstream.com/about/index.html.>.

"VitalStream Acquires Eonstreams to Provide Comprehensive Online Advertising Solutions," VitalStream, Press Release, May 22, 2006, 3 pages, [online] [retrieved on May 22, 2006] Retrieved from the Internet: <URL: www.vitalstream.com/news/release-05-22-06.html>.

PCT International Search Report, PCT/US02/04769, Jul. 23, 2002, 2 pages.

PCT International Search Report, PCT/US02/19983, Oct. 18, 2002, 1 page.

PCT International Search Report and Written Opinion, PCT/US06/09350, Jan. 11, 2007, 7 pages.

\* cited by examiner

In Campaign Manager (guaranteed campaigns)

In Campaign Manager
(open campaigns)

US 8,099,326 B2

TRAFFIC ESTIMATOR

CROSS-REFERENCE TO RELATED APPLICATION

This application is a continuation in part of U.S. patent application Ser. No. 11/445,768, entitled "Media Play Optimization", filed Jun. 1, 2006, and which claims priority under 35 U.S.C. §119(e) to U.S. Provisional Patent Application Ser. No. 60/686,535, entitled "System and Method for Media Play Optimization," filed Jun. 1, 2005, the subject matter of which are incorporated herein by reference in their entirety.

FIELD OF THE INVENTION

The present invention relates to broadcasting and online media, and more particularly to systems for estimating bids for media plays.

BACKGROUND

Audio advertisers spend great sums of money and countless hours to produce advertising campaigns aimed at maximizing the response from the listeners. By tailoring the advertising media, the timing of the audio play, the content of the advertisement, and many other variables, advertisers can influence who will or is likely to hear the advertising message. In this way, audio advertisers can concentrate their efforts on reaching the listeners who are most likely to respond to their advertising message. Generally, advertisers are willing to pay more money for advertising slots that allow them to deliver their message to the most members of their target audience. Because advertisers have a limited budget and limited time to manage campaigns, they are eager to identify which campaigns are effective and, perhaps more importantly, which are not.

At the same time, broadcasters rely on advertising revenues from selling advertising air time to cover operational expenses. Thus, it is to the broadcaster's advantage to sell all available advertising air time in order to maximize income. Unfortunately, a significant portion of the available advertising air time is not sold due market demand factors, poor ratings, station inefficiencies, trafficking logistics, programming logistics, and other factors. In fact, radio stations, for example, often operate with daily unsold advertising inventory that accounts, on average, for up to 30% of the total advertising air time. This unpaid air time has traditionally been filled with public service advertisements, bonus advertisements, remnant advertisements and/or low-priority advertisements.

SUMMARY

One embodiment is directed to providing estimates for bidding in auctions of media plays (e.g., advertising slots) for media feeds, such as radio.

Criteria for media play placement in a media feed are received from a subscriber as part of an ad campaign. The criteria are compared to historical information related to past media placement in the media feed and to demographic information related to listeners of the media feed. Bids are generated for the media plays in response to the historical information meeting the criteria.

In one aspect, the criteria are used to select stations and dayparts. A recursion is run on the ad campaign's combination of market areas, stations and dayparts, breaking it down to individual station/dayparts to allocate a budget based on the criteria among the stations and dayparts to simulate the auctions and associated bids for the media plays according to stations and dayparts.

It is to be understood that the figures and descriptions of the present invention have been simplified to illustrate elements that are relevant for a clear understanding of the present invention, while eliminating, for the purposes of clarity, many other elements found in a typical inventory tracking system. Those of ordinary skill in the pertinent art will recognize that other elements are desirable and/or required in order to implement the present invention.

DETAILED DESCRIPTION OF THE EMBODIMENTS

It is to be understood that the figures and descriptions of the present invention have been simplified to illustrate elements that are relevant for a clear understanding of the present invention, while eliminating, for the purpose of clarity, many other elements found in typical communication system and method of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

In one embodiment, a system and method estimate bids for auctions of media play according to specified criteria from an advertiser.

Figure 1:
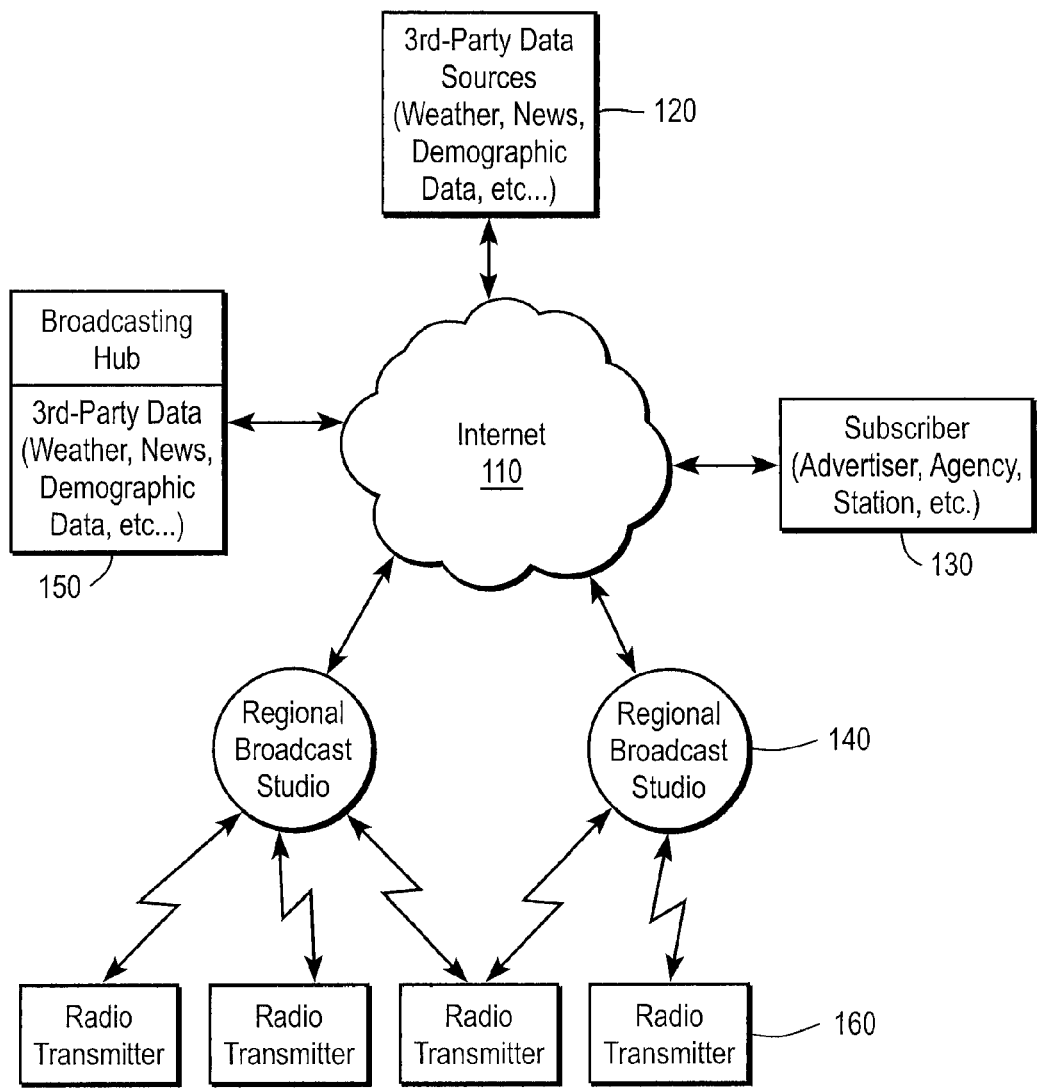
FIG. 1 illustrates an architecture of a communication system according to an aspect of the present invention.

FIG. 1 shows an exemplary architecture of a communication system 100 according to an aspect of the present invention. Communication system 100 may include a network 110 to communicatively couple third-party data sources 120, at least one subscriber 130, at least one regional broadcast studio 140, and a broadcasting hub 150. In a radio broadcast implementation, at least one regional studio 140 may be further communicatively coupled to at least one radio transmitter 160.

As used herein, the term "media play" refers to the audio, visual or computerized output transmitted in a media feed. As used herein, the term "media feed" includes any transmission of any media to one or more receivers of the media, including but not limited to terrestrial or satellite radio broadcasts; voice over IP; internet streaming; podcasts, webpages; video games with a communication connection, such as console, online and handheld video games; and video players with a communication connection; and mobile phones. As used herein, the terms "radio content" and "broadcast" or "broadcast content" include any type of media that may be presented via audio, visual, or computerized output to one or more receivers of the output, and that is presently programmed or preprogrammed for media play. As used herein, the terms "nonradio content", or "nonbroadcast" or "broadcast nonspecific content", include any media that may be presented via audio, visual, or computerized output to one or more receivers of the content, for example via a media feed, and that is not presently programmed or preprogrammed for media play.

As shown in FIG. 1, the network 110 is the Internet. In other implementations, the network 110 can be any network, such as a LAN, a MAN, a WAN, a wired or wireless network, a private network, or a virtual private network.

In the example shown in FIG. 1, third-party data sources can be any database, data mart, or other data source that provides data of interest to a subscriber 130 relevant to the scheduling of their advertisement. For example, the third-party data may be Arbitron ratings and demographic breakdowns for each station in a broadcast network. In another embodiment, information or data is received or collected directly by the broadcasting hub 150 rather than from third-party sources. Regardless of the source, the broadcasting hub 150 uses the information in evaluating whether criteria are met for the play of an advertisement.

A subscriber 130 is also communicatively coupled to the broadcasting hub 150. This allows the subscriber 130 to purchase, schedule, and upload an advertising spot using a user interface of the broadcasting hub 150 that is describe in detail below. Subscriber 130 may access hub 150 via a connection to internet 110. The connection to internet 110 may be any conventional connection that allows access to hub 150. For example, subscriber 130 may access hub 150 using TCP/IP and a conventional dial-up connection over a modem, or a dedicated connection that provides constant access. Hub 150 may have a unique HyperText Transfer Protocol (HTTP) address, a unique FTP address, or any other addressing scheme that allows subscriber 130 to identify hub 150. Subscribers 130 can be advertisers, agencies, stations, or any other entity that interacts with the broadcasting hub 150. In some embodiments subscribers 150 have an account with the broadcasting hub 150 and are charged a fee for use of the broadcasting hub 150. In other embodiments, subscribers can access the broadcasting hub 150 free of charge.

A regional broadcast studio 140 is also communicatively coupled to the broadcasting hub 150, such that the broadcasting hub 150 is capable of forwarding an advertisement to the regional broadcast studio 140 for play. Thus, a subscriber 130 is capable of submitting to the broadcasting hub 150 an advertisement for play along with specific criteria for the play of that advertisement, and the broadcasting hub 150 will forward the advertisement to a regional broadcasting studio 140 for play as appropriate.

Stations may desire and may be able to isolate themselves from the internet for a myriad of reasons. According to an aspect of the present invention, stations may isolate mission critical on-air work stations from the public internet Specifically, the present system may enable on-air workstations to connect securely to a data center over the internet without the on-air workstation being connected directly to the internet Such a configuration may be achieved by using encryption and secure protocols, including, but not limited to outbound-originating protocols.

Subscriber 130 may conduct one or more advertising campaigns by purchasing audio advertisements across several local and regional radio stations, for example. Subscriber 130 may distribute audio commercials to the radio stations for scheduling by the regional broadcast studio 140. Subscriber 130 may select the advertising campaign based on local markets, type of radio station, demographics of users, day and time of airing the ads, duration of the campaign, and length of the ads. Subscriber 130 may also select a budget for a predetermined time period, such as a weekly budget. Subscriber 130 may select a campaign that is local, national or network specific. In one embodiment, the user provides the campaign information through a web browser. A traffic estimator 220 (FIG. 2) provides bidding guidance to the subscriber for media play bids.

Figure 2:
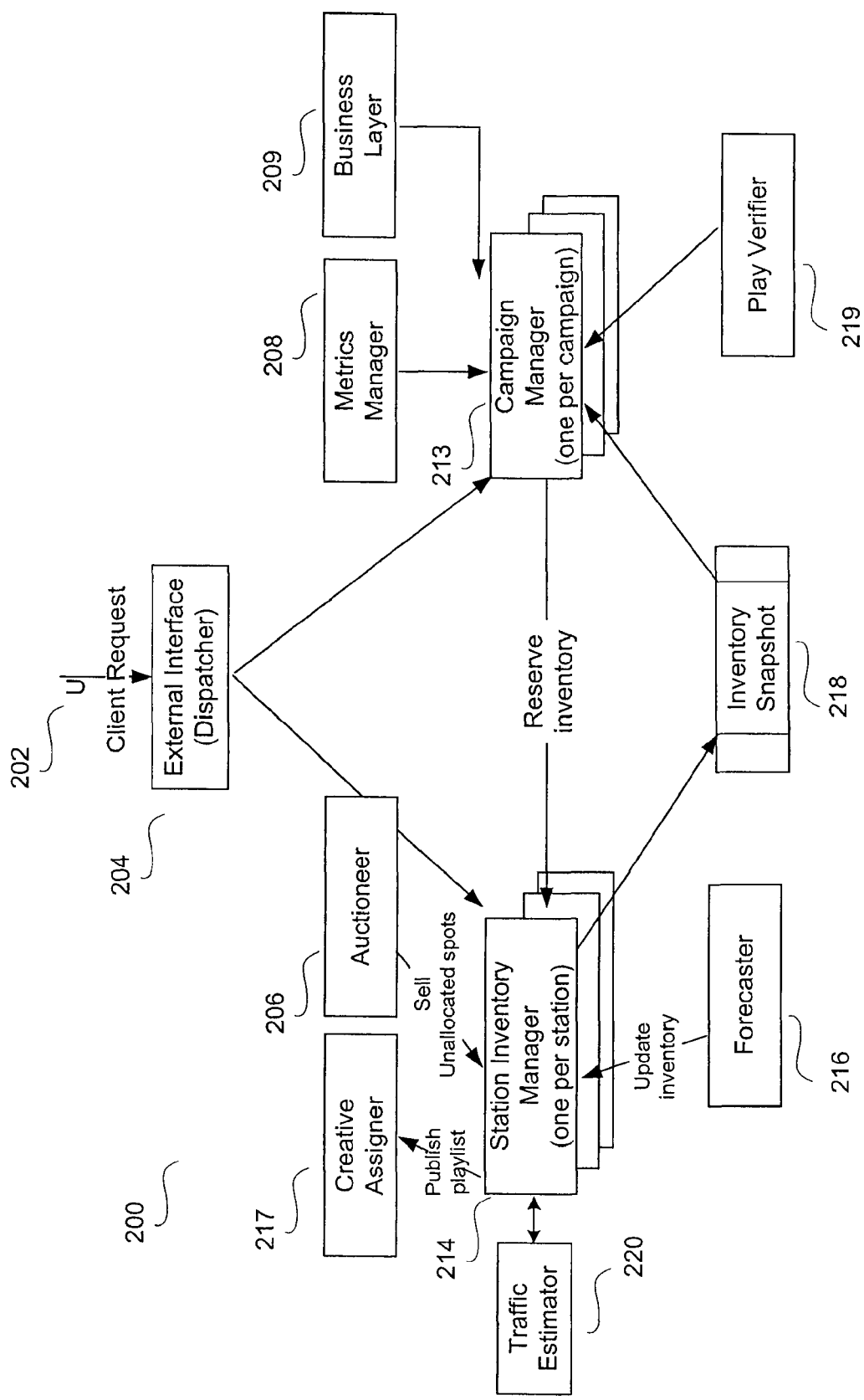
FIG. 2 is a block diagram showing elements used to schedule advertisements in a preferred embodiment of the present invention.

FIG. 2 is a block diagram showing elements in scalable IMS (Inventory Management System) 200 used to schedule advertisements in a preferred embodiment of the present invention. The system 200 places radio ads on select radio stations, matching advertiser campaigns and creatives with available advertising spots on radio stations.

In the described embodiment, the IMS 200 supports three models for buying available advertising slots: Guaranteed, reserved based on urgency, and Open (also called Auction).

Guaranteed campaigns (also referred to as Spot-Buy campaigns) are promised specific spots on a specified station, date, and daypart. In one embodiment, once the campaign books the spots, it will lose the spot only via play failure or if the forecasted inventory is not published by the station, not through preemption from another campaign booked through the system. Guaranteed campaigns can range in length anywhere up to several months in length, and can be booked up to several months in advance. At times, advertisers place value on knowing that a particular spot will run at a particular time.

Guaranteed campaigns are not simply an inventory reservation, however, because of the way that the advertisers specify their campaigns. For example, they may not specify which stations and times to play on, instead they provide targeting criteria, such as number of listeners, listener demographics, the times of day to run, the markets play in, and so forth. Audio Ads then compares those criteria against the available inventory and presents a proposal for meeting those criteria. In one implementation, guaranteed campaigns specify a maximum CPM to pay. Each guaranteed campaign takes as much inventory as it needs to satisfy its campaign goals while keeping within its spending limits and other user-specified criteria. If the advertiser is happy with the station and time mix then they approve the campaign and Audio Ads books it. Specifying campaign goals, viewing the proposal, and finalizing or booking the campaign are all done online through the Audio Ads front end. In one embodiment, the system should take no more than a few seconds (say, 10 seconds) to prepare a proposal once the criteria have been specified. The user must review the proposal and can book it within a few minutes. If the user waits too long to book the proposal, in one implementation, a new proposal will be generated to prevent staleness of the proposal in light of inventory changes.

In the reserved based on urgency model, campaigns can reserve inventory as in the guaranteed model. However, campaigns with a higher urgency take precedence over campaigns with lower urgency. In one embodiment, spots are presented to the campaign with the highest "urgency". Each spot is auctioned off in turn. In one embodiment, urgency is defined as being first in time to book, with one approach simply assigning earlier-booked campaigns the highest urgency.

Open campaigns play on inventory that has not been filled by guaranteed campaigns and can be preempted by guaranteed campaigns. Open campaigns are booked according to desired demographics and market criteria and the maximum CPM the advertiser is willing to pay. In one implementation, inventory spots not filled by guaranteed campaigns are filled with open campaigns at the last moment. In one embodiment, a system administrator can set a percentage inventory to set aside for open campaigns that will not be sold to guaranteed campaigns. Open campaigns compete among themselves for spots, with the "highest bidder" winning. The "bid" from an open campaign can be based on how well a spot meets the campaign goals in addition to the CPM. Every campaign determines what the spot is worth in terms of the campaign's goals. For example, each campaign evaluates each spot according to the relevant target demographic information for the campaign and adjusts the bid according to the campaign goals based on other criteria, such as time of day, market, etc. The auction process for open campaigns can be run at various intervals, for example, hourly, several times a day, once a day, or at other intervals. The traffic estimator 220 assists the subscriber 130 for making bids for spots in the auctions for the open campaign.

One factor that complicates the reservation process is that some of the inventory is not well known in advance. Since Audio Ads often only receives the precise schedule, for example, one day in advance but spots can be sold months in advance, it is possible that spots will be sold to a guaranteed campaign that ends up not being made available. Ads also may fail to play because of play failures. Audio Ads addresses the first issue by forecast inventory, though the forecasting may not be precise. The second issue is addressed after the fact. Since it is a goal of the system to meet 100% of the guaranteed campaign requirements, Audio Ads monitors guaranteed campaigns in progress and adds additional "make good" spots whenever spots are lost or fail to play. In one embodiment the user can enable or disable make goods.

The Audio Ads Inventory Management System (IMS) 200 is responsible for matching advertising campaigns to available advertising spots on the radio stations or other broadcast technologies serviced. Campaigns are usually specified as a set of constraints or criteria that the campaign must meet, such as markets the ad will play in, demographics it should reach, the number of listeners who should hear it, and the times of the day (dayparts) during which it should run. Radio stations typically publish the available spots one day in advance. In one embodiment, this inventory is then matched to the campaigns to satisfy the maximum number of campaigns. Since spots will be more valuable to some campaigns than to others (for example, the demographics of a certain spot may match one campaign but not another), it is desirable to optimize the allocation of spots across multiple campaigns.

In one embodiment, inventory is known just one day in advance, but campaigns generally are booked days, weeks, or months in advance. Campaigns are frequently timed to match external events such as sales or movie releases, so predictability can be important. The Audio Ads system 200 deals with these competing factors by forecasting inventory. Currently, a simple exponential smoothing method is used to forecast inventory many months in advance. In other embodiments, the method accounts for trends or seasonality. Alternatively, different forecasting models are applied on a station by station basis.

The External Interface 204 provides external access to the system 200 through a UI 202. UI 202 interacts with the rest of system 200 to create and manage campaigns and for reporting. A Station Inventory Manager (SIM) 214 manages all inventory for a single station. It maintains information about each spot such as whether it is an actual available spot or a forecast spot; whether it is available, reserved, or booked; the priority of the campaign that booked it; when it was booked; who booked it; and so forth. A Forecaster 216 is responsible for updating the inventory based on the radio station schedule. It can provide exact information for upcoming spots or may forecast future spots based on past history. A Campaign Manager (CM) 212 manages a single campaign, buying inventory on behalf of the campaign to meet campaign goals, and buying new inventory if its existing inventory is lost or fails to play. On a regular basis, SIMs 214 record their current allocations to persistent storage. A Creative Assigner 217 then assigns creatives to spots (using the allocations produced by the SIMs 214) and produces the final play list.

Each of the components in the diagram can be implemented as a separate process and could be allocated to its own machine. In other embodiments, however, for efficiency purposes, multiple SIMs will be grouped together in one task, multiple CMs will be grouped together in one task, and the Forecaster will be implemented as classes and run within the SIM's JVM. (If the SIM is implemented in Java)

Components

An overview of each of the components of system 200 is given below.

External Interface (Dispatcher) 202

All external access to the system 200 goes through the External Interface. The External Interface provides methods for creating and managing campaigns and for examining inventory. Methods for creating and managing campaigns will be used by the Audio Ads front-end to provide the advertiser user interface. Methods for examining inventory will be used primarily by reporting tools.

Station Inventory Manager 214

The Station Inventory Manager (SIM) 214 manages all inventory for a single station. It maintains a list of all known spots for that station and automatically allocates spots to particular campaigns. Since spots are forecasted, it is possible for a campaign to book a spot that later disappears from inventory. Whenever a booked spot is removed from inventory, the Campaign Manager that owns that spot will try to make up the loss.

Each spot in the inventory has a priority which matches the priority of the campaign that allocated the spot. When a campaign requests spots from the SIM, the SIM can allocate unassigned spots or spots with a lower priority than the requesting campaign. In this way, each campaign has a different view of available inventory that depends on the campaign priority. This feature is intended to allow different campaign types, such as guaranteed campaigns (where specific spots are sold in advance) and open campaigns (where spots can be taken by someone willing to pay more). It also allows urgent, high priority campaigns to take inventory from less important campaigns. If necessary to reduce memory requirements, inventory older than one day may be discarded.

Spots in the inventory have, among other attributes, a unique identifier, a play date, a play time, a length, an accuracy (actual or forecast), a booking status (available, reserved, or booked), a priority (taken from the priority of the booking campaign), a booking date, and a booking campaign. These attributes are merely examples. In other embodiments, spots in inventory may have a greater or lesser number of attributes.

Spots can be reserved on a temporary basis by a campaign so that a potential buy can be displayed to a user for approval. If the spots are not booked within the timeout period they will be returned to inventory in the same state they were in before the reservation. A campaign may only book spots that it has previously reserved. In one implementation, reserved spots cannot be reserved or booked by campaigns at the same or lower priority than the owning campaign.

Campaigns do not query inventory but instead request to reserve or book inventory. This avoids concurrency issues that would arise if a campaign requests a view of inventory but that inventory is taken by another campaign before the first campaign can reserve it. All reservations and bookings are automatic so that a campaign can be guaranteed that spots that it has booked actually belong to it. Of course, campaigns with a higher priority can still take that inventory from the booking campaign, which will need to book alternate spots to make up for the loss. For reporting and recovery purposes, the SIM 214 will support general queries of existing inventory, but such queries should be infrequent.

When a campaign requests spots, it should make a request such as "reserve N spots of this length on this day and in this daypart". The SIM 214 will search its inventory and do the best it can to honor the request while taking into account station rules such as maximum number of spots assigned to a single campaign, no back-to-back spots assigned to a single campaign, and so forth. The SIM 214 manages stitching issues by coalescing adjacent shorter spots when possible and by preferentially fulfilling requests with stitched spots. For example, if a SIM 214 has a 60-second spot available, it may assign half of it to a 30-second campaign and then assign the second half to the very next 30-second campaign.

The following sequence of events takes place in response to requests:
  On Reserve:
  matching spots are removed from inventory
  the reservation is timed so that spots can be restored after the timeout
  On Book (Only Reserved Spots can be Booked):
  the spots are allocated to the booking campaign
  On Release (Either Explicit or Via Timeout):
  if the spot is currently booked: the spot is marked as available
  if the spot is currently reserved: the spot is returned to its pre-reservation state Campaign Manager 213

The Campaign Manager manages a single campaign, buying inventory on behalf of the campaign to meet campaign goals, and buying new inventory if its existing inventory is lost or fails to play.

When a campaign is booked, a Campaign Manager is created for that campaign which then attempts to reserve (and subsequently book) the inventory that will fill the campaign goals. It queries the Metrics Manager 208 to learn of radio stations, AQH, CPM, etc., and determine which stations it should attempt to buy from. There will be an Inventory Snapshot available to the Campaign Manager that holds a slightly stale view of inventory. This snapshot can be used to refine the initial inventory request. For example, a campaign may wish to spread its purchases equally across markets and may need to know its chances of getting inventory in specific markets before finalizing the purchases. If any of its purchases are unsuccessful, the Campaign Manager will attempt to buy alternate spots until its goals are met.

As inventory changes due to higher priority campaigns taking inventory or because of play failures, the Campaign Manager will learn of these changes. When inventory is lost the Campaign Manager must attempt to "make good" by buying alternate spots. The Campaign Manager will attempt to buy a spot that is roughly equivalent to the spot that was lost. No other considerations will be taken when buying a "make-good" spot.

The Campaign Manager does not know the precise state of the inventory when it determines what buys to attempt. It should request N spots from the radio stations in its market within the days and dayparts that meet its criteria, while in one embodiment making a small number of large requests rather than a large number of small requests. Some of those requests will succeed and others will fail or will be only partially fulfilled. Once the Campaign Manager knows the status of all its requests, it will determine if additional buy attempts are needed to meet its goals. It may be possible that, to meet proper market or daypart distribution, a Campaign Manager will want to return spots to inventory. This is allowed if the spots have been reserved but not yet booked, and the returned spots will revert to their prior status. However, this mechanism is expected to be a small fraction of total buys.

A campaign can be paused, in which case no spots for that campaign will be actually played (unless they have already been queued to the station). The spots will not be returned to inventory unless the campaign is cancelled. If spots from a paused campaign need to be filled, they will be auctioned off by the Auctioneer. When a campaign is resumed it should not lose any of its inventory, except what was auctioned off because its play time has passed. The primary purpose for pausing a campaign would be to temporarily block a campaign because the account holder has not paid its bills. If the account is cancelled, all campaigns for that account should be cancelled; if the account is reactivated, all paused campaigns should be resumed.

If a campaign is cancelled, the Campaign Manager should release its entire inventory. The SIM provides functionality for releasing all inventory belonging to a specific campaign over a range of dates.

As described below in connection with FIG. 3B, campaign manager 1313 can bid in accordance with a criterion, including an external criterion.

Pricing Engine 207

In the above-described embodiment, campaign pricing is currently determined on a campaign-by-campaign basis through negotiation with the advertiser booking the campaign. This is especially true of nationwide campaigns that buy guaranteed spots. In other embodiments, however, pricing is more dynamic and able to be set online or automatically while booking the campaign. In one embodiment, the Campaign Manager 213 uses a Pricing Engine 207 to determine the price of spots it buys. The price from the Pricing Engine 207 is passed to the SIM, which uses it to determine which campaigns to prefer when allocating inventory.

In one embodiment, the Pricing Engine associates each spot with a price at which a Campaign Manager can reserve it as part of a guaranteed campaign. In one implementation, the pricing set by the engine may vary based on buy type, buyer, and/or other factors.

In one embodiment, the Pricing Engine is part of the Campaign Manager. In other embodiments, the Pricing Engine is a component separate from the CM 213.

Metrics Manager 208

The Metrics Manager has the job of maintaining and providing station metrics for all stations supported by IMS. The Campaign Manager can learn all relevant information about potential inventory from the Metrics Manager. In some embodiments, Metrics System 200 also contains a business layer that determines, for example, which stations are online, what is a station's format, and what is a station's market. In other embodiments, these functions are also performed by the Metrics Manager. Metrics Manager also tells the Campaign Manager what demographics a station caters to, and what their listener numbers are. The Campaign Manager 213 access the Metrics Manager 208 and business layer 209 to receive information. For example, the Campaign Manager can request the average listeners as reported by Arbitron for certain dayparts on certain stations. Alternatively, data from other survey or research companies can be used. The Campaign Manager can further request from the Metrics Manager 208 data corresponding only to a specific demographic at which the campaign is targeted.

In one embodiment, the Metrics Manager 208 holds all its data in a database In one implementation, the Metrics Manager supports various metrics for calculating the value of spots for particular campaigns on alternate research besides Arbitron.data. The Campaign Manager can indicate which research or metric type to use, and the Metrics Manager finds and normalizes the data before returning the values.

Forecaster 216

The Forecaster's primary responsibility is to predict and adjust inventory for a station. For efficiency purposes, the Forecaster may run in the same process as the SIM 214.

At the end of each day or other period, as the station's schedule is confirmed and the schedule performance for the prior day or period becomes known, the Forecaster should recalculate both known and expected inventory for the coming days or periods. This forecast will add new spots to inventory, remove existing spots from inventory, or adjust the play time of existing spots. If inventory is lost, the owning campaign is notified so that it can buy additional, "make-good" inventory. Note that in one embodiment, when determining which spot to eliminate, the spot within the daypart with the lowest priority should be removed.

Inventory for the immediate future should be known precisely, while inventory further in the future is be predicted. The accuracy of the prediction should be marked in the inventory and adjusted as the data becomes more precise. For example, spots for "tomorrow" might be accurate to the minute, while spots for "next month" might be accurate only to a daypart. In addition to accuracy, the forecaster also predicts the reliability of the inventory, based on an analysis of prior station performance and the accuracy of the forecast. If a station frequently schedules inventory but then fails to play it, this will be reflected in the reliability. Spot reliability may be used by the campaign buyer to evaluate the quality of the campaign.

When inventory is moved to more accurate times, it may be possible that the spots within a daypart can no longer be correctly allocated to all the campaigns that have booked spots within that daypart. For example, it may become impossible to place two spots from the same campaign because they would play too close to each other. If this should happen, the Forecaster will need to take inventory from a campaign and deallocate it. Campaign Managers are notified of any spots they lose.

In one embodiment, forecaster 206 uses a Holt-Winters exponential smoothing method, which takes into account both trends and seasonality. The architecture supports applying different forecasting models on a station by station basis.

While the actual computation of the forecast is very fast, especially with exponential smoothing methods which can complete their computation with the addition of just a single new number, updating the inventory can be computationally expensive. The reason for this is that the Forecaster must update existing inventory by adding new spots, removing lost spots, or adjusting the play time of existing spots. Therefore, in one embodiment, the Forecaster either maintains its own copy of all existing inventory, or it queries the SIM to learn its inventory. It then calculates deltas from existing inventory to new inventory and applies the changes. For these reasons it is expected that the Forecaster will best be implemented in the same process as the SIM so that expensive, large-payload process-to-process communication is avoided.

Since the inventory update process only adds, removes, or adjusts the play time of inventory, it should be able to execute while the SIM is processing requests from the Campaign Managers. One time this would be an issue is if an update of an existing spot changes its daypart after a campaign has bought the spot but before the response has been sent, since the Campaign Manager would thus receive stale data which might alter its goal calculations. To avoid this, changes to a spot's play time (which occurs infrequently) should be synchronized with spot reservation.

Play Verifier 219

At the end of each day the Play Verifier 219 examines the play history for each station and determine if spots that were allocated failed to play. The owning Campaign Manager is notified for each failure. In one embodiment, Campaign Managers attempt to make good any play failures.

Creative Assigner 217

When the final play list needs to be generated for a station, the Creative Assigner will read the persistent allocations written by the SIM(s), assign creatives to specific spots (allocations), and make the play list available to the Audio Server. Creative assigner 1317 can perform copysplitting in accordance with a criterion, such as an external criterion or a criterion based on effectiveness of previous plays.

Auctioneer 206

The Auctioneer 206 performs an auction on a regular basis when there are spots to be sold to open campaigns that have not be sold to guaranteed campaigns. The number of campaigns competing for the spots can potentially be quite large.

The method for performing the auction are as follows:
The Auctioneer opens bidding for unsold spots.
Open Campaign Managers that are interested in the station examine the Inventory Snapshot to determine what spots may potentially be bid upon.
Each Open Campaign Manager sends its bids to the Auctioneer.
The Auctioneer waits a reasonable amount of time for all bids to come in. This interval should be short enough to ensure timely completion of the auction but lengthy enough that normal latency is accounted for.
The Auctioneer picks the winning bid and books the spot with the SIM.
The Auctioneer notifies all winning Campaign Managers so that they can update their campaign status.

In one embodiment, the auction is run on a scheduled basis. Bidding will remain open for a number of minutes determined via configuration, for example about 10 minutes. Open Campaign Managers must examine the schedule and place bids in a timely manner. However, not all campaigns bid at the same time. In one embodiment, Open Campaign Managers will randomize the times at which they will place bids, to reduce peak bandwidth requirements.

Since the auction is only taking place for unallocated spots within, for example, one single day, the auction is expected to execute quickly.

Open Campaigns

While the above architecture will handle campaigns of all types and requirements, the special requirements of Open Campaigns can cause a rather large flood of inventory grabs and subsequent losses as higher priority campaigns take those spots. Open Campaigns have market and demographics requirements, but they are designed to take only inventory not allocated to guaranteed campaigns.

Following the above architecture, an Open Campaign would grab all available inventory in its desired markets, up to its price cap. This can be a large number of spots. Further, current business requirements demand that all Open Campaigns compete fairly for inventory, so as new Open Campaigns book inventory, they must, on a random basis, bump other Open Campaigns from their spots. Finally, Open Campaigns have the lowest priority of all campaigns, so as higher priority campaigns are booked, it is possible that the majority of spots they take will already be owned by an Open Campaign. Therefore, in these cases, a Campaign Manager should be notified.

These characteristics of Open Campaigns suggest that, for efficiency purposes, they should be handled separately from other campaigns. That mechanism is described here.

Rather than reserving inventory when an Open Campaign is booked, Open Campaigns will instead compete in an auction for unallocated spots just prior to the spots being published to the allocation list. It will typically cover all unsold inventory for one single day, but the timeframe can be more or less than one day.

The auction to fill spots runs before the SIM publishes its allocations. After the auction has run, allocations may be published. The Creative Assigner then reads the published allocations, assigns creatives, and writes the final play list. Any spots still left unfilled are delivered to the Audio Server unallocated, which will typically result in, for example, a Public Service Announcement being played in that spot. In one embodiment, system 200 sends more than one ad in the stream to the target (such as a radio station or podcast target). Both ads are initially sent and at a later time, but before either of the ads is played, the system sends an indication of which ad should be played. In another embodiment, both ads are played, but the system 200 sends an indication of their relative percentage of play time.

In one embodiment, system 200 sends more than one ad in the stream to the target, such as a radio station or podcast target. Both ads are initially sent and at a later time, but before either of the ads is played, the system 200 sends an indication of which ad should be played. In another embodiment, both ads are played, but the system 200 sends an indication of their relative percentage of play time.

For example, based on an advertiser request, the trafficking system 210 may schedule the play of a particular ad in three slots at three assigned times each day during the weekdays of Monday through Friday. Obviously, once advertising inventory builds, conflicts arise between advertising requests, particularly during rush hour or high desirability playtimes.

Traffic Estimator 220

Subscriber 130 may select a maximum cost per thousand (CPM) bid and a budget for an advertising campaign, and select the campaign specifics which may include markets, desired demographics, and dayparts. In response, the traffic estimator 220 generates recommended bids and expected results of the auction based on the bids. The expected results may include, for example, expected average CPM, expected weekly spend, expected weekly impressions (equal to expected weekly spend/CPM), and expected weekly unique listeners. The traffic estimator 220 may also generate campaign predictions that include a summary of CPM, listeners and raw cost by market segment, and summary of trends and volatility in same.

In one embodiment, subscriber 130 does not provide a maximum CPM. In this case, the traffic estimator 200 also provides a recommended maximum CPM bid for meeting the budget, based on a numerical solver. In one embodiment, the solver is a bisection method. In another embodiment, the solver is based on a reguli falsi method. In yet another embodiment, the solver is based on combination of a bisection method and a reguli falsi method.

In one embodiment, the subscriber 130 may create an ad campaign with heterogeneous segments with a recommended single CPM bid, even though it will be too high for some segments and too low for others (e.g., if his campaign includes Fresno and Los Angeles metro areas, generally subscriber 130 should bid more for Los Angeles on a CPM basis.) In another embodiment, the user may define different CPM bids in his campaign, such as on a market segment basis.

In one embodiment, the traffic estimator 220 bases the winning bid as the bid of the runner-up plus one cent.

The traffic estimator 220 may be executed in a Spring framework container running in Java programming language.

The traffic estimator 220 may estimate the bid using probability density functions (PDFs) built with historical data of bids and sales of media plays for radio stations and dayparts. The PDFs may be non-normal PDFs of random variables, and may include seasonality of the random variable (e.g. spot availability increases in sweeps week, monthly and annual cycles), and trends of the random variable (because the number of spots will likely increase over time).

Figure 3A:
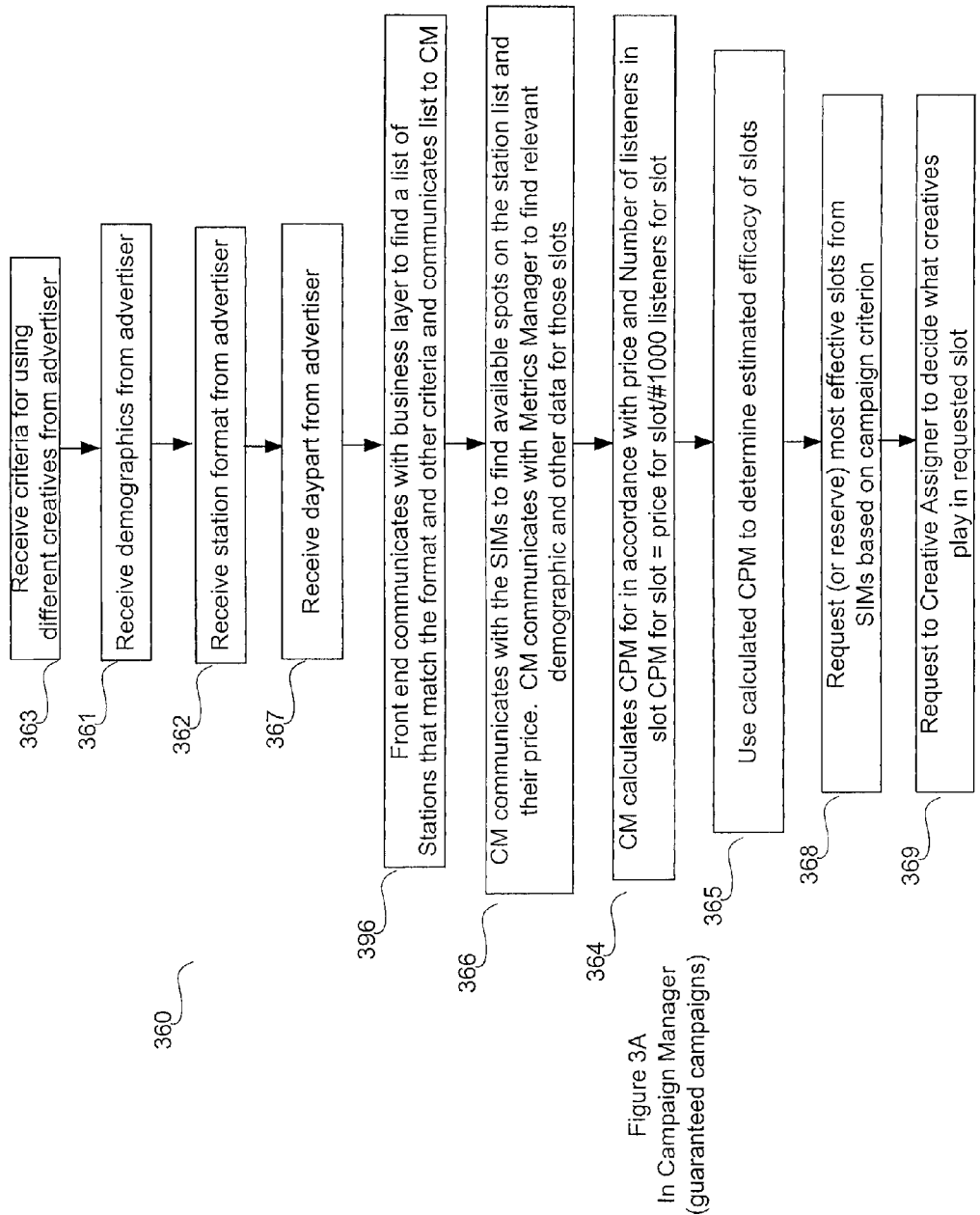
FIG. 3A is a flow chart showing a method used by a campaign manager in a guaranteed campaign.

FIG. 3A is a flow chart showing 360 a method used by Campaign Manager 213. This flow chart shows actions performed by CM 213 and other elements of system 200 to determine effective slots in which to place ads in accordance with an advertiser-entered criterion in a guaranteed campaign. In element 363, CM 213 receives from an advertiser at least one criterion for using different creatives. In element 361, CM 213 receives from an advertiser demographics for the campaign. For example, the advertiser may specify that the campaign is directed toward adults age 18-24. In element 362, CM 213 receives a station format from the advertiser (for example, light rock). In element 367, CM 213 receives a daypart from the advertiser (such as morning drive time). The order of at least elements 363-367 can change in other embodiments. Other embodiments can receive other information from advertisers that may affect play of advertising or other creatives. The front end communicates 396 with a business layer to identify a list of stations that fit the user's specifications (which can include formats, etc.). This information is passed to the CM with other user inputs. In element 366, CM 213 knows what spots are available from the SIMs inventory. CM 213 communicates with the Metrics Manager to find relevant demographic and other data for those slots. The CM requests price information for the slots from the SIMs. In element 364, CM 213 calculates CPM in accordance with a price and a number of listeners in slot.

CPM=price for slot/#1000 listeners for slot

In element 365, CM 213 uses the calculated CPM to determine the estimated efficacy of the slot based on the campaign criteria. In element 368, CM 213 requests or reserves from the SIM 214 the most effective slots. In element 369, Creative Assigner decides which creative to play in a requested slot.

Figure 3B:
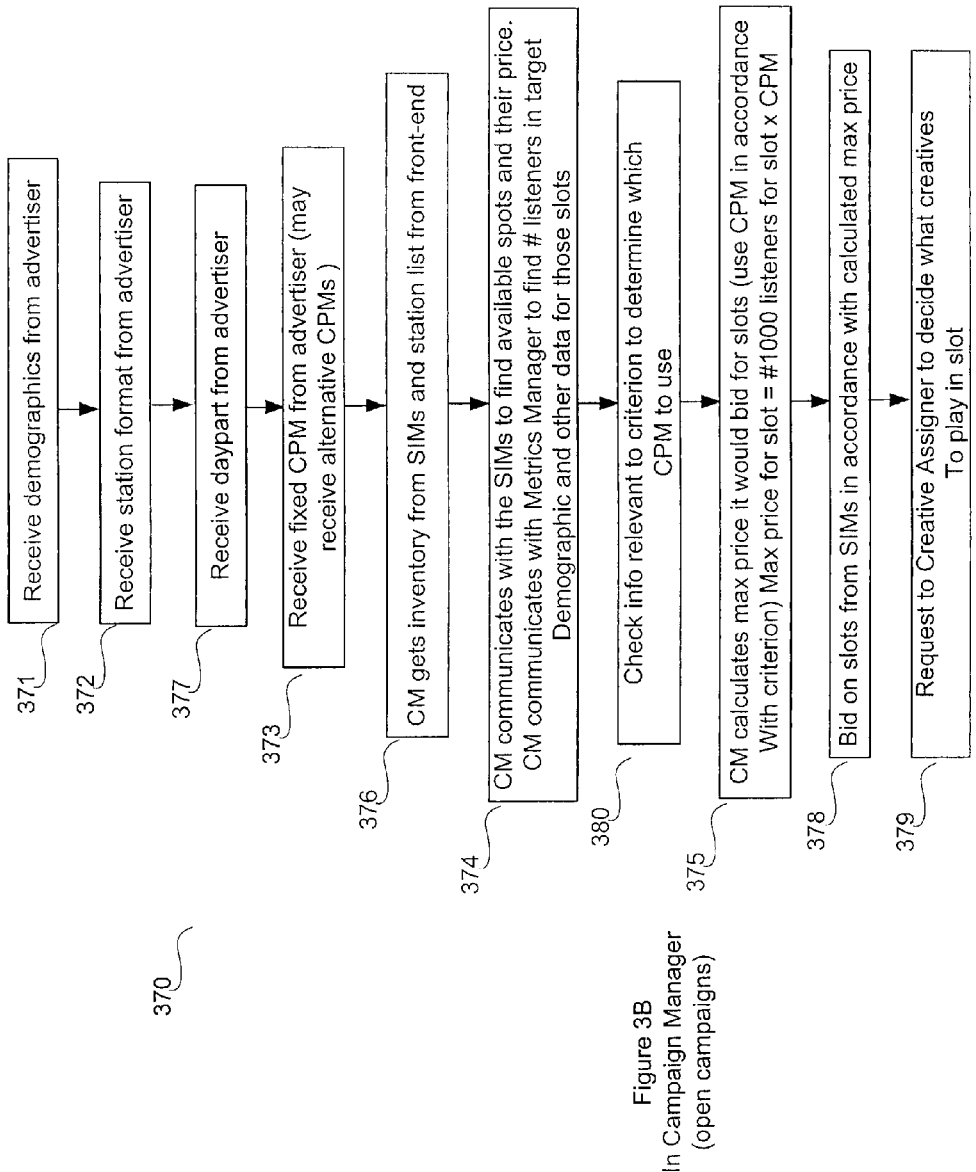
FIG. 3B is a flow chart showing a method used by a campaign manager in an open campaign.

FIG. 3B is a flow chart 370 showing a method used by Campaign Manager 213. This flow chart shows actions performed by CM 213 to determine effective slots in which to place ads in accordance with an advertiser-entered criterion in an Open campaign.

In element 371, CM 213 receives from an advertiser demographics for the campaign. For example, the advertiser may specify that the campaign is directed toward adults age 18-24. In element 372, CM 213 receives a station format from the advertiser (for example, light rock). In element 377, CM 213 receives a daypart from the advertiser (such as morning drive time). The order of at least elements 371-377 can change in other embodiments. Other embodiments can receive other information from advertisers that may affect placement of advertising or other creatives. In element 373, CM 213 receives a fixed CPM value from the advertiser. In element 376, the CM 213 gets inventory list from the SIMs and a station list that matches (for example) the specified format(s) from the front-end. In element 374, the CM 213 communicates with SIMs to find available spots and their price and communicates with Metrics Manager 208 to find a number of listeners in the target demographic and possibly other data for those slots. In element 380, CM 213 checks information relevant to the criterion to determine which CPM to use (e.g., it checks the received information against the criterion). In element 375, CM 213 calculates a maximum price that it would bid in accordance with a price and a number of listeners in slot.

Max price for slot=#1000 listeners for slot×CPM

In element 378, CM 213 uses the calculated max price to communicate with SIM 214 to bid on spots. In element 379, Creative Assigner decides which creative to play in a slot resulting from the auction.

Figure 4:
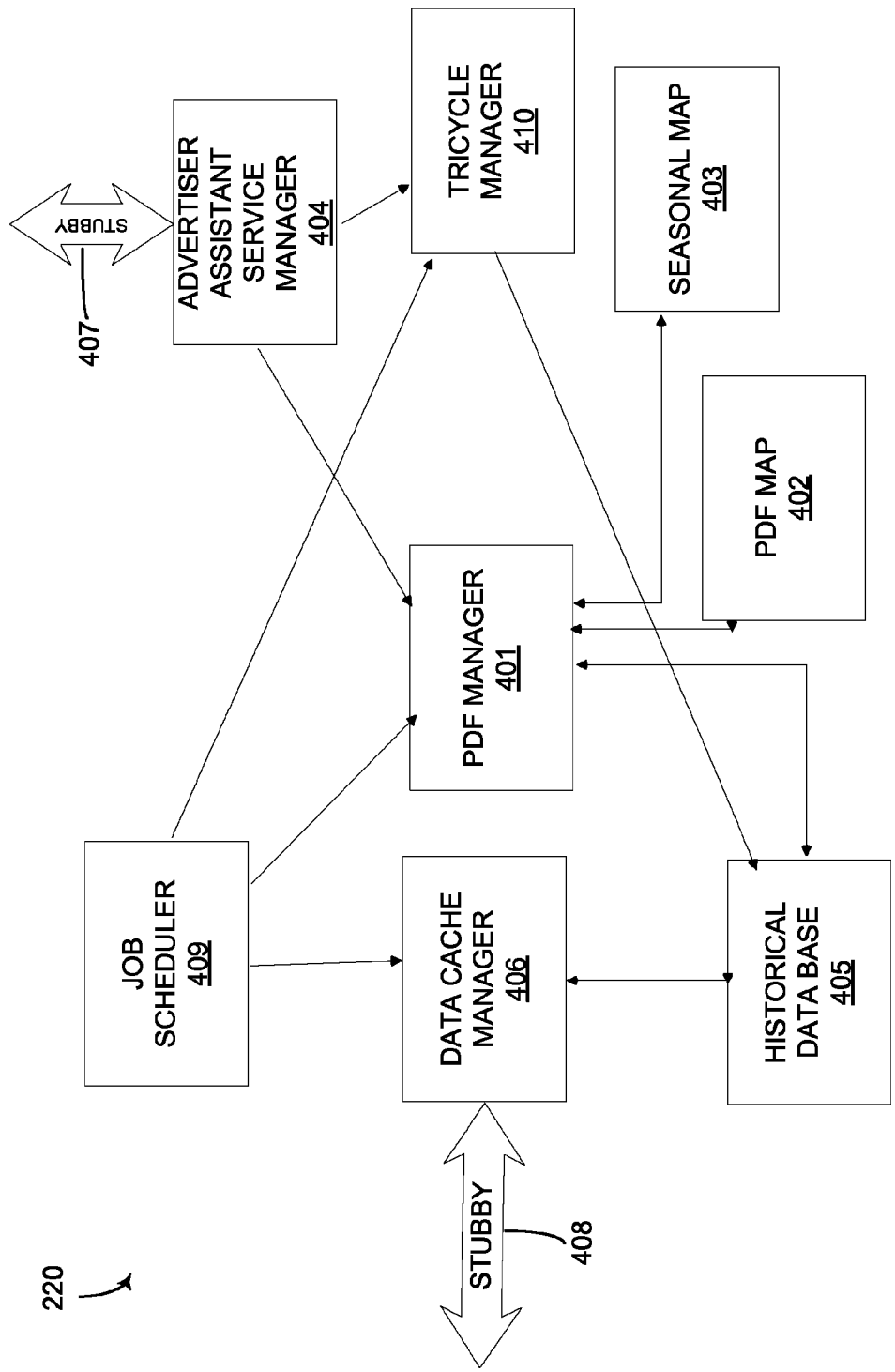
FIG. 4 is a block diagram showing a traffic estimator of the elements of FIG. 2.

FIG. 4 is a block diagram showing a traffic estimator 220.

A PDF manager 401 maintains references to a PDF hash map 402 and a seasonal hash map 403. The PDF map 402 and the seasonal map 403 may be cached in a disk or reloaded as needed. The PDF map 402 stores historical spot information according to station and daypart, and may store the information as probability density functions. The seasonal map 403 stores historical information of past spot information based on seasonal factors, and may store the information as integer arrays.

In one embodiment, the PDF map 402 includes PDFs for stations and course-grained dayparts (e.g., M-F 0-6, M-F 6-10, and so forth) to provide large samples sizes to obtain desired accuracies of the statistical predictions.

The PDF manager 401 services the tricycle manager 410 and the advertiser assistant service manager 404. The PDF manager 401 may update the PDFs, retrieve PDFs or retrieve seasonality information. During an update of the PDFs, the PDF manager 401 rebuilds the map of distributions. The update may be periodically requested, such as weekly, by a batch scheduler. The PDF manager 401 accesses the ad placement history in the historical database 405. In one embodiment, the historical database 405 is indexed to accelerate query responses. During retrieval, the PDF manager 401 retrieves from the PDF map 402 a distribution corresponding to the ads for a requested station and a requested daypart. During a retrieval of seasonality objects, the PDF manager 401 retrieves from the seasonal map 403 seasonal objects representing spot counts for a station by a specific time period, such as month, week and day/daypart for a requested station 140.

In one embodiment, an analyst may manually generate a simulation of historical data for a new station that does not have historical data based on similarity to other stations in the same or similar metro area or same or similar format. In another embodiment, an automated database procedure may simulate historical data for the new station. As data is accumulated for the new station, the PDF map is revised An advertiser assistant service manager 404 communicates via a stubby 407 with the subscriber 130. The data cache manager 406 communicates via a stubby 408 with a demographic database, such as Arbitron. The stubbys 407 and 408 are remote procedure calls.

The data cache manager 406 retrieves demographic data from a data source 120. In one embodiment, the data cache manger 406 retrieves the demographic data in response to a request from the PDF manager 401, which in turn was triggered by from the job scheduler 409. The data retrieval may be done in a batch for the PDF manager to update the PDF map 402. In one embodiment, the demographic data is grouped by station/daypart combinations. The data cache manager 406 retrieves an estimate of the number of listeners: For a given station, the estimated number of Average Query Hour (AQH) listeners, is broken down by gender and age groups (e.g. male 12-17, male 18-20, and so forth.), for example, for all 6 standard dayparts. The data cache manager 406 requests:

In executing this method, it passes RMS the following inputs:
  station identifier,
  the 6 standard Day part codes;
  Advertiser's preferred survey id;
  The requested demographics, for example:
  AQH—male 12-17
  AQH—male 18-20
  AQH—male 21-24
  AQH—male 25-34
  AQH—male 35-44
  AQH—male 45-54
  AQH—male 55-64
  AQH—male 65+
  AQH—female 12-17
  AQH—female 18-20
  AQH—female 21-24
  AQH—female 25-34
  AQH—female 35-44
  AQH—female 45-54
  AQH—female 55-64
  AQH—female 65+;

The stubby 408 returns messages including station identifier; day part code, and the AQH listeners for a specific demographic. The data cache manager 406 formats the data for the PDF manager 401. In one embodiment, the format is an integer array of estimated listeners, indexed by daypart and listener demographics.

The advertiser assistant service manager 404 generates an estimate of a weekly spending of a campaign, and if requested by a subscriber 130, generates a recommended CPM bid based on the weekly budget. Although budgets are described herein in terms of weekly budgets, budgets for other time intervals may be used. The advertiser assistant service manager 404 analyzes a campaign and estimates weekly spending and an average CPM of the campaign based on a maximum CPM bid. On the other hand, if no maximum CPM bid is selected, the advertiser assistant service manager 404 analyzes a campaign and recommends to the advertiser a maximum CPM bid of the campaign that meets the budget, by using a solver. In one embodiment, the advertiser assistant service manager 404 estimates the budget by a recursion, breaking the campaign into its constituent station daypart combinations and then estimating auction results using the PDFs for each of the constituent station dayparts. The advertiser assistant service manager 404 uses a bisection solver as described below in conjunction with FIG. 6.

A tricycle manager 410 executes a seasonal analysis of the media play slots based on time cycles. In one embodiment, the tricycle manager 410 uses a Holt Winters model of seasonality. In another embodiment, the tricycle manager 410 uses an Arthur Weinberger model that analyzes monthly cycles or weekly cycles.

According to the Weinberger model, radio ad spot availability exhibits 3 seasonal patterns. Within a month, there is more availability in the middle weeks than in the first and fourth weeks. Similarly there are more spots in the middle months of a year, and there are also patterns in the 7 days of a week. Consequently, the tricycle manager 410 estimates the rates of spot availability for a station for various time intervals. The advertiser assistant service manager 404 uses the tricycle manger 410 to adjust the non seasonal estimates produced using the PDFs, thus creating seasonally adjusted budget estimates. The tricycle manager 410 adjusts the spots per time for a given station and daypart based on Weinberger's formula:

Expected Spot count for month of year m, week of month w, daypart of week dp=
Average Spot count for daypart dp*
[Average Spot count for week w/(sum Spot count for all weeks/4) if w<5 else 1]*
[$\alpha$*Average Spot count for month m/(sum all dayparts in that month with repeats/(12*day count/7))+1−$\alpha$]

The tricycle manager 410 may adjust the spots per week for a station and daypart between two dates by partitioning the spots into constituent day parts, and then summing the results of the adjust spots per time with each specific daypart. The tricycle manager 410 converts the spot count to an annualized rate.

Figure 5:
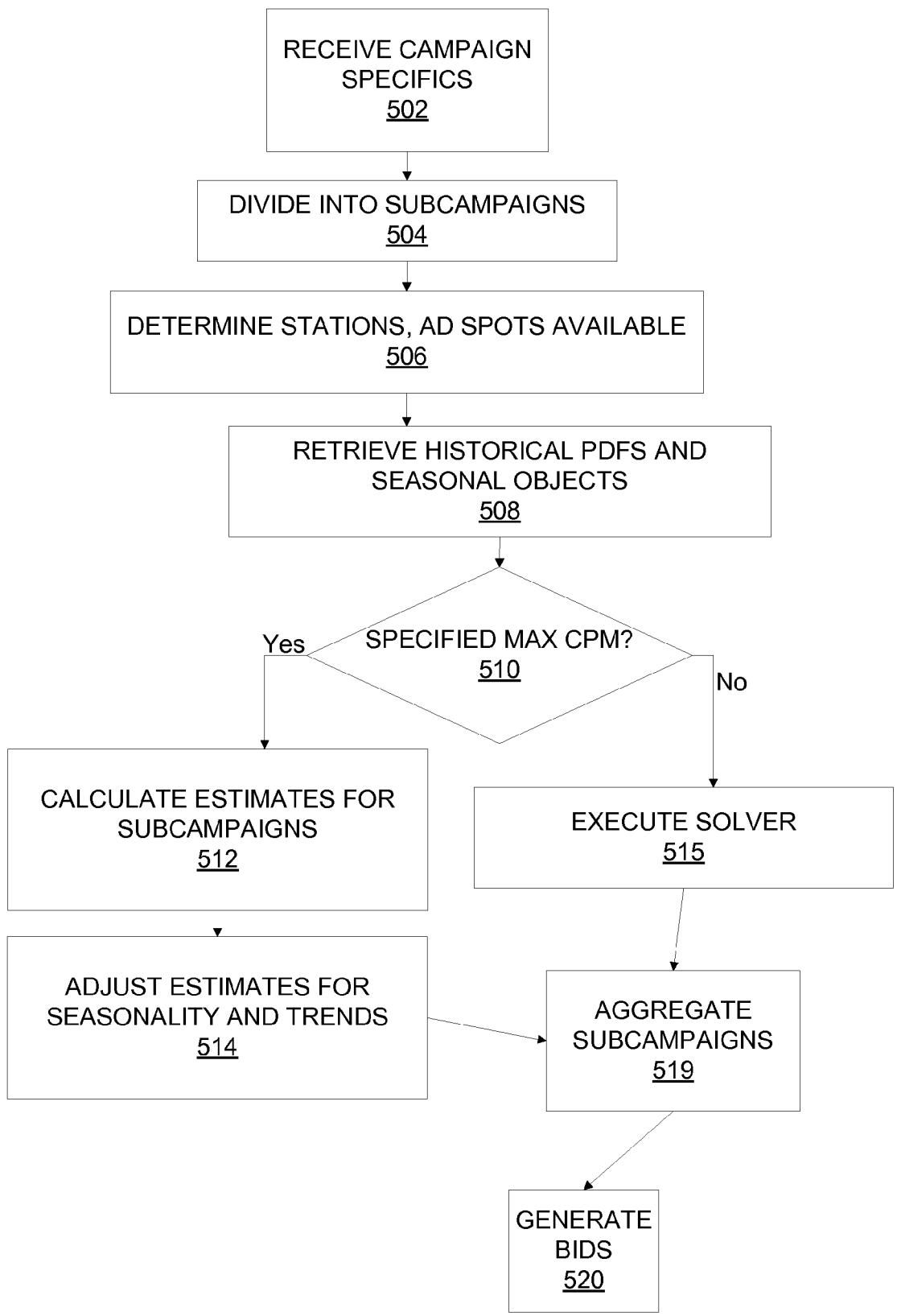
FIG. 5 is a flow chart showing a method used by the traffic estimator of FIG. 4.

FIG. 5 is a flow chart showing a method used by the traffic estimator 200.

The traffic estimator 220 receives 502 from the subscriber 130 campaign specifics, such as expected weekly spend or a desired CPM bid for an advertising campaign. The traffic estimator 220 divides 504 the campaign into sub-campaigns according to the requested markets (e.g., DMA metro areas), stations, and dayparts. The traffic estimator 220 may use the process described below in conjunction with FIG. 7 to allocate budgets. The traffic estimator 220 divides 504 the campaign into sub-campaigns, corresponding to the DMA metro areas, stations and day parts, for a recursive analysis to determine the bids for various media plays. The traffic estimator 220 determines 506 stations and ad spots available for the sub-campaigns, and retrieves 508 the historical PDFs and seasonal objects for the stations. The traffic estimator 220 may determine 506 the stations and ad spots using the process of FIGS. 3A and 3B.

If the customer has specified 510 a maximum CPM, the traffic estimator 220 calculates 512 an expected CPM and weekly spending for each sub-campaign, unadjusted for seasonality or trend, using the PDF map 402. The traffic estimator 220 adjusts 514 the sub campaign results for seasonality using the seasonal map 403. The traffic estimator 220 aggregates 519 the sub-campaigns, and generates 520 the recommended bids for the various media plays in the recommended dayparts for the recommended stations.

Figure 6:
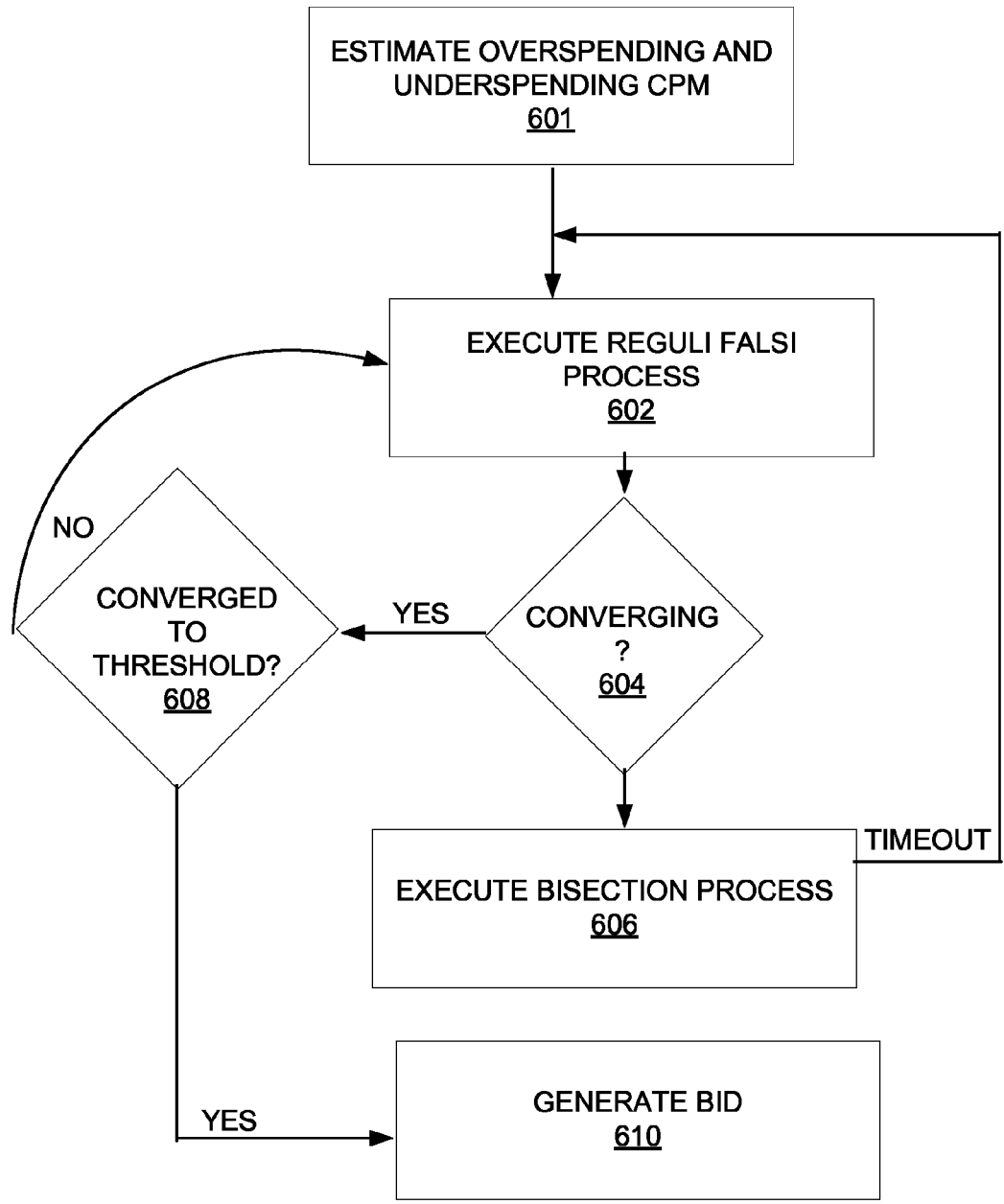
FIG. 6 is a flow chart showing a method of a solver of the method of FIG. 5.

If the customer has not specified 510 a maximum CPM, the traffic estimator 220 executes 515 a solver procedure as described in FIG. 6. The solver procedure selects a maximum CPM guess that is expected to be above the estimated CPM, and then iteratively determines a CPM and a weekly budget. As described in more detail below, the solver is a hybrid of bisection and regula falsi solvers. The hybrid technique may provide faster convergence for monotone increasing, discontinuous sample distributions functions. The traffic estimator 220 aggregates 519 the sub-campaigns, and generates 520 the recommended bids for the various media plays in the recommended dayparts for the recommended stations.

FIG. 6 is a flow chart showing the execute solver 515 of the method of FIG. 5. The traffic estimator 220 estimates 601 an overspending CPM (e.g., a CPM that exceeds the expected CPM for the ad) and an underspending CPM (e.g., zero dollars). This defines an interval including the expected CPM, and for a monotone PDF, the solver converges.

The traffic estimator 220 executes 602 a reguli falsi process. Reguli falsi uses secants to update the interval endpoints. If the process is converging 604, the traffic estimator determines 608 whether the convergence meets a threshold. If not 608, the traffic estimator 220 continues executing 602 the reguli falsi process. If the convergence meets the threshold, the traffic estimator 220 generates a bid. Otherwise if the process is not converging 604, the traffic estimator 220 executes 606 a bisection process until a timeout occurs and then continues executing 602 the reguli falsi process. The converging 604 allows the reguli falsi process to execute as long as it converges. The bisection process always converges, but is typically slower than a reguli falsi process. As noted above, in alternative embodiments, one of the bisection and the reguli falsi processes is performed.

Figure 7:
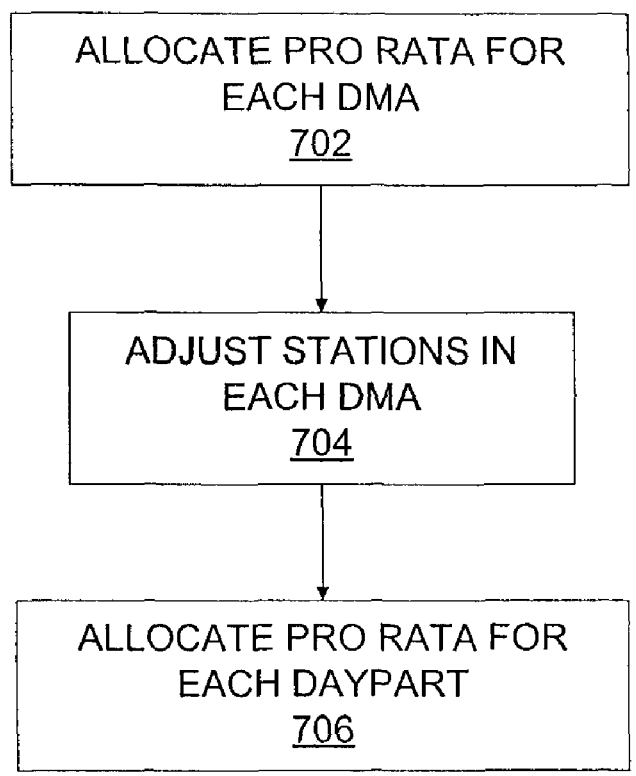
FIG. 7 is a flow chart illustrating a method of dividing into sub-campaigns in the method of FIG. 5.

FIG. 7 is a flow chart illustrating the dividing into sub-campaigns 504.

A campaign may include multiple segments. For example, a campaign may include several DMA metro areas, several station formats and several day parts. The traffic estimator 220 allocates the budget across segments to determine the sub-campaigns. The traffic estimator 220 allocates 702 the budget based on user specified ratios for each DMA. The traffic estimator 220 adjusts 704 the stations in a DMA. In another embodiment, the traffic estimator may use the stations as requested by the subscriber 130. The traffic estimator 220 allocates 706 based on user specified ratios for each daypart. In an alternative embodiment, the allocation may be determined in part or in whole by using a range rather than fixed pro rata. In another embodiment, the subscriber 130 may determine in part or in whole the allocation of some or all of the segments.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
   receiving, by a server system from a client system associated with a user, criteria for media play placement in a media feed;
   generating a list of available ads based on the received criteria;
   for each one of the available ads on the generated list,
      selecting, by the server system, an overspending cost per thousand (CPM) bid and an underspending CPM bid for the one of the available ads,
      defining, by the server system, a bid interval that includes the overspending CPM bid as one endpoint, and the underspending CPM bid as the other endpoint,
      iteratively, until the bid interval has converged within a threshold range:
         applying, by the server system, a reguli falsi process to the bid interval until the bid interval converges, then, when a range of the converged bid interval is larger than the threshold range,
         applying, by the server system, a bisection process to the converged bid interval for a predetermined period of time, and
      outputting, as an expected CPM bid for the one of the available ads, a result of applying the reguli falsi process and the bisection process; and
   generating, by the server system, bids for the available ads on the generated list as the corresponding expected CPM bids that have been output via the reguli falsi process and the bisection process.

2. The computer-implemented method of claim 1, wherein the expected CPM is output, by the server system, as the result of iteratively applying the reguli falsi process and the bisection process.

3. The computer-implemented method of claim 1, wherein the selecting of the overspending CPM bid and the underspending CPM bid comprises:
   dividing a plurality of media plays in sets of media plays, each set associated with a criterion of the received criteria for media play placement;
   accessing historical information related to bidding for past media play placement in the media feed for each criterion of the received criteria for media play placement; and
   performing the selecting of the overspending CPM bid and the underspending CPM bid in response to failing to obtain from the user respective maximum CPMs corresponding to the received criteria for media play placement.

4. The computer-implemented method of claim 3, further comprising:
   generating, by the server system, a map of probability density functions (PDFs); and
   storing, in the generated map of PDFs, respective portions of the historical information associated with respective criteria for media play placement in a media feed,
   wherein said accessing the historical information includes retrieving PDFs from the generated map of PDFs corresponding to the received criteria, and
   wherein said selecting the overspending CPM bid and the underspending CPM bid is based on the retrieved PDFs corresponding to the received criteria.

5. The computer-implemented method of claim 4, further comprising:
   generating, by the server system, an additional probability density function map; and
   storing seasonal information in the generated additional probability density function map,
   wherein said selecting the overspending CPM bid and the underspending CPM bid is further based on the additional probability density function map.

6. The computer implemented method of claim 1, wherein the user comprises an advertiser.

7. The computer implemented method of claim 1, wherein the received criteria for media placement in the media feed comprise radio market areas, radio stations, dayparts, a budget for a time interval, type of radio stations, and listener demographics.

8. The computer implemented method of claim 7 wherein
the dividing the plurality of plays in the sets of media plays includes:
generating a list of radio stations based on the received criteria; and
generating a list of available ads for the radio stations in said time interval,
the accessing the historical information related to bidding for the past media play placement includes determining historical bids for dayparts of the radio stations in the list, and
the method further comprises estimating, by applying the reguli falsi process and the bisection process to the bid interval, respective CPMs for selected ads of the generated list of available ads for each of the received dayparts, such that a cost of the total estimated CPMs is less than or equal to the received budget for the time interval.

9. A computer program product stored on a non-transitory computer readable medium that when executed by data processing apparatus causes the data processing apparatus to perform operations comprising:
receiving, from a client system associated with a user, criteria for media play placement in a media feed;
generating a list of available ads based on the received criteria;
for each one of the available ads on the generated list,
selecting an overspending cost per thousand (CPM) bid and an underspending CPM bid for the one of the available ads,
defining a bid interval that includes the overspending CPM bid as one endpoint, and the underspending CPM bid as the other endpoint,
iteratively, until the bid interval has converged within a threshold range:
applying a reguli falsi process to the bid interval until the bid interval converges, then, when a range of the converged bid interval is larger than the threshold range,
applying a bisection process to the converged bid interval for a predetermined period of time, and
outputting, as an expected CPM bid for the one of the available ads, a result of applying the reguli falsi process and the bisection process; and
generating bids for the available ads on the generated list as the corresponding expected CPM bids that have been output via the reguli falsi process and the bisection process.

10. The computer program product of claim 9, wherein the expected CPM is output as the result of iteratively applying the reguli falsi process and the bisection process.

11. The computer program product of claim 9, wherein the operations further comprise:
dividing a plurality of media plays in sets of media plays, each set associated with the one a criterion of the received criteria for media play placement;
accessing historical information related to bidding for past media play placement in the media feed for each criterion of the received criteria for media play placement; and
performing the selecting of the overspending CPM bid and the underspending CPM bid in response to failing to obtain from the user respective maximum CPMs corresponding to the received criteria for media play placement.

12. The computer program product of claim 11, the operations further comprise:
generating a map of probability density functions (PDFs); and
storing, in the generated map of PDFs, respective portions of the historical information associated with respective criteria for media play placement in a media feed,
wherein said accessing the historical information includes retrieving PDFs from the generated map of PDFs corresponding to the received criteria, and
wherein said selecting the overspending CPM bid and the underspending CPM bid is based on the retrieved PDFs corresponding to the received criteria.

13. The computer program product of claim 12, wherein the operations further comprise:
generating an additional probability density function map; and
storing seasonal information in the generated additional probability density function map,
wherein said selecting the overspending CPM bid and the underspending CPM bid is further based on the additional probability density function map.

14. The computer program product of claim 9, wherein the received criteria for media placement in the media feed comprise radio market areas, radio stations, dayparts, a budget for a time interval, type of radio stations, and listener demographics.

15. The computer program product of claim 14 wherein
said dividing the plurality of plays in the sets of media plays includes:
generating a list of radio stations based on the received criteria; and
generating a list of available ads for the radio stations in said time interval,
said accessing the historical information related to bidding for the past media play placement includes determining historical bids for dayparts of the radio stations in the list, and
the operations further comprise estimating, by applying the reguli falsi process and the bisection process to the bid interval, respective CPMs for selected ads of the generated list of available ads for each of the received dayparts, such that a cost of the total estimated CPMs is less than or equal to the received budget for the time interval.

16. A system comprising:
one or more processors communicatively coupled with a client system associated with an advertiser; and
memory associated with the one or more processors and configured to store instructions that when executed by the one or more processors cause the system to perform operations comprising:
receiving, from a client system associated with a user, criteria for media play placement in a media feed;
generating a list of available ads based on the received criteria;
for each one of the available ads on the generated list,
selecting an overspending cost per thousand (CPM) bid and an underspending CPM bid for the one of the available ads,
defining a bid interval that includes the overspending CPM bid as one endpoint, and the underspending CPM bid as the other endpoint,
iteratively, until the bid interval has converged within a threshold range:

applying a reguli falsi process to the bid interval until the bid interval converges, then, when a range of the converged bid interval is larger than the threshold range, applying a bisection process to the converged bid interval for a predetermined period of time, and outputting, as an expected CPM bid for the one of the available ads, a result of applying the reguli falsi process and the bisection process; and generating bids for the available ads on the generated list as the corresponding expected CPM bids that have been output via the reguli falsi process and the bisection process.

17. The system of claim 16, wherein the expected CPM is output as the result of iteratively applying the reguli falsi process and the bisection process.

18. The system of claim 16, wherein the operations further comprise:

dividing a plurality of media plays in sets of media plays, each set associated with a criterion of the received criteria for media play placement;

accessing historical information related to bidding for past media play placement in the media feed for each criterion of the received criteria for media play placement; and performing the selecting of the overspending CPM bid and the underspending CPM bid in response to failing to obtain from the user respective maximum CPMs corresponding to the received criteria for media play placement.

19. The system of claim 18, wherein the operations further comprise generating a map of probability density functions (PDFs) corresponding to respective portions of the historical information associated with respective criteria for media play placement in a media feed;

generating an additional probability density function map based on seasonal information;

storing in the memory the generated maps;

retrieving PDFs from the stored maps; and performing said selecting the overspending CPM bid and the underspending CPM bid based on the retrieved PDFs.

* * * * *

UNITED STATES PATENT AND TRADEMARK OFFICE
CERTIFICATE OF CORRECTION

PATENT NO.        : 8,099,326 B2
APPLICATION NO.   : 11/554934
DATED             : January 17, 2012
INVENTOR(S)       : Ryan S. Steelberg Page 1 of 1

It is certified that error appears in the above-identified patent and that said Letters Patent is hereby corrected as shown below:

First page, Column 2, under Foreign Patent Documents, please delete "128079" and insert -- 1285079 -- therefor.

Column 19, line 57, after "with", please delete "the one".

Signed and Sealed this
Twenty-second Day of May, 2012

David J. Kappos
*Director of the United States Patent and Trademark Office*